United States Patent
Ratliff et al.

(10) Patent No.: US 11,920,333 B2
(45) Date of Patent: Mar. 5, 2024

(54) MAGNETIC POSITION SENSOR FOR AIRCRAFT TOILET FLUSH VALVE

(71) Applicant: MAG Aerospace Industries, LLC, Carson, CA (US)

(72) Inventors: Robert G. Ratliff, Buena Park, CA (US); David Beach, Los Alamitos, CA (US); Steven Schwartz, Long Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 267 days.

(21) Appl. No.: 17/441,530

(22) PCT Filed: Mar. 20, 2020

(86) PCT No.: PCT/US2020/023845
§ 371 (c)(1),
(2) Date: Sep. 21, 2021

(87) PCT Pub. No.: WO2020/191288
PCT Pub. Date: Sep. 24, 2020

(65) Prior Publication Data
US 2022/0170252 A1 Jun. 2, 2022

Related U.S. Application Data

(60) Provisional application No. 62/821,662, filed on Mar. 21, 2019.

(51) Int. Cl.
*E03D 1/34* (2006.01)
*B64D 11/02* (2006.01)
(Continued)

(52) U.S. Cl.
CPC ............... *E03D 1/34* (2013.01); *B64D 11/02* (2013.01); *E03D 5/024* (2013.01); *F16K 37/0041* (2013.01); *G01D 5/145* (2013.01)

(58) Field of Classification Search
CPC ........... E03D 1/34; E03D 5/024; B64D 11/02; F16K 37/0041; G01D 5/145
(Continued)

(56) References Cited

U.S. PATENT DOCUMENTS 6,370,709 B1 4/2002 Stradinger et al.
6,509,734 B1 1/2003 Luetzow
(Continued)

FOREIGN PATENT DOCUMENTS

| EP | 1596165 A2 | 11/2005 | |
| WO | WO-2011154620 A1 * | 12/2011 | ............... E03B 7/07 |
| WO | 2018191190 A1 | 10/2018 | |

OTHER PUBLICATIONS

International Patent Application No. PCT/US2020/023845, International Search Report and Written Opinion, dated Jul. 8, 2020.
(Continued)

*Primary Examiner* — Tuan N Nguyen
(74) *Attorney, Agent, or Firm* — Kilpatrick Townsend & Stockton LLP

(57) ABSTRACT

Vacuum toilet flush valves. The disclosure uses a precise positioning of a magnet with respect to a flush valve plate in order to identify absolute alignment accurately.

3 Claims, 4 Drawing Sheets

(51) Int. Cl.
*E03D 5/02* (2006.01)
*F16K 37/00* (2006.01)
*G01D 5/14* (2006.01)

(58) Field of Classification Search
USPC ................... 4/378, 434–435, 438–439, 441
See application file for complete search history.

(56) References Cited

U.S. PATENT DOCUMENTS

| | | |
|---|---|---|
| 6,909,281 B2 | 6/2005 | Gassman et al. |
| 6,972,558 B1 | 12/2005 | Robinson |
| 8,113,263 B2 | 2/2012 | Reed et al. |
| 9,163,747 B2 | 10/2015 | Dolenti et al. |
| 10,202,747 B2 | 2/2019 | Hoang et al. |
| 10,501,923 B2 | 12/2019 | Bauer et al. |
| 2009/0189110 A1 | 7/2009 | Dolenti et al. |
| 2019/0277014 A1 | 9/2019 | Hoang et al. |

OTHER PUBLICATIONS

Chris Woodford, How reed switches work (magnetically operated switches), dated Jun. 26, 2019, https://explainthatstuff.com/howreedswitcheswork.html.

* cited by examiner

MAGNETIC POSITION SENSOR FOR AIRCRAFT TOILET FLUSH VALVE

CROSS REFERENCE TO RELATED APPLICATIONS

This application is related to and claims priority benefits from U.S. Provisional Application Ser. No. 62/821,662, filed on Mar. 21, 2019, entitled "Magnetic Position Sensor for Aircraft Toilet Flush Valve," the entire contents of which is hereby incorporated by this reference.

FIELD OF THE INVENTION

The field of this disclosure relates to vacuum toilet flush valves. Particular features find use onboard aircraft. The disclosure uses a precise positioning of a magnet with respect to a flush valve plate in order to identify absolute alignment accurately.

BACKGROUND

Many vehicles such as passenger aircraft, buses, trains, ships, automobiles, and the like include vacuum toilets. Vacuum toilets use a flush plate valve that is operated via a motor and that rotates within a housing. The flush valve plate typically has at least one port that allows waste to pass. The port can be moved to be aligned with a waste line (to an open position) so that waste can be suctioned from the toilet bowl (or other waste receptacle) into a main waste tank. When the flush is complete, the flush valve plate port is moved out of alignment with the waste opening (to a closed position) in order to close the waste line.

First generation flush valves used electro-mechanical switches that could only distinguish open and closed status. These switches are typically bulky, expensive, and difficult to adjust. Second generation flush valves have used reed switches combined with a magnet traveling on a gear of the motor. These valves have limited need for adjustment and can provide higher reliability with lower cost, but the reed switches can be fragile and subject to damage during shipping and manufacturing. Additionally, similar to the first generation flush valves, reed switches only distinguish between open and closed positions. Improvements are thus desirable.

SUMMARY

The present inventors have identified a precise positioning of a magnet with respect to a flush valve plate in order to identify absolute alignment accurately.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there may be provided a sensing system for a vacuum flush waste system, comprising a flush valve plate positioned within a housing, the flush valve plate having a rotational shaft and a port, the housing having a waste opening; a magnet positioned on the rotational shaft; and a magnet position sensor positioned adjacent to the magnet and configured to sense the position of the magnet, wherein the sensing system senses an absolute position of the magnet in order to relay information about a location of the port with respect to the waste opening. The system may also incorporate a printed circuit board onto which the magnet position sensor is mounted. The magnet and the magnet position sensor may be encased in protective housings. In a specific example, the magnet is positioned along a flush valve axis.

DETAILED DESCRIPTION

Figure 1:
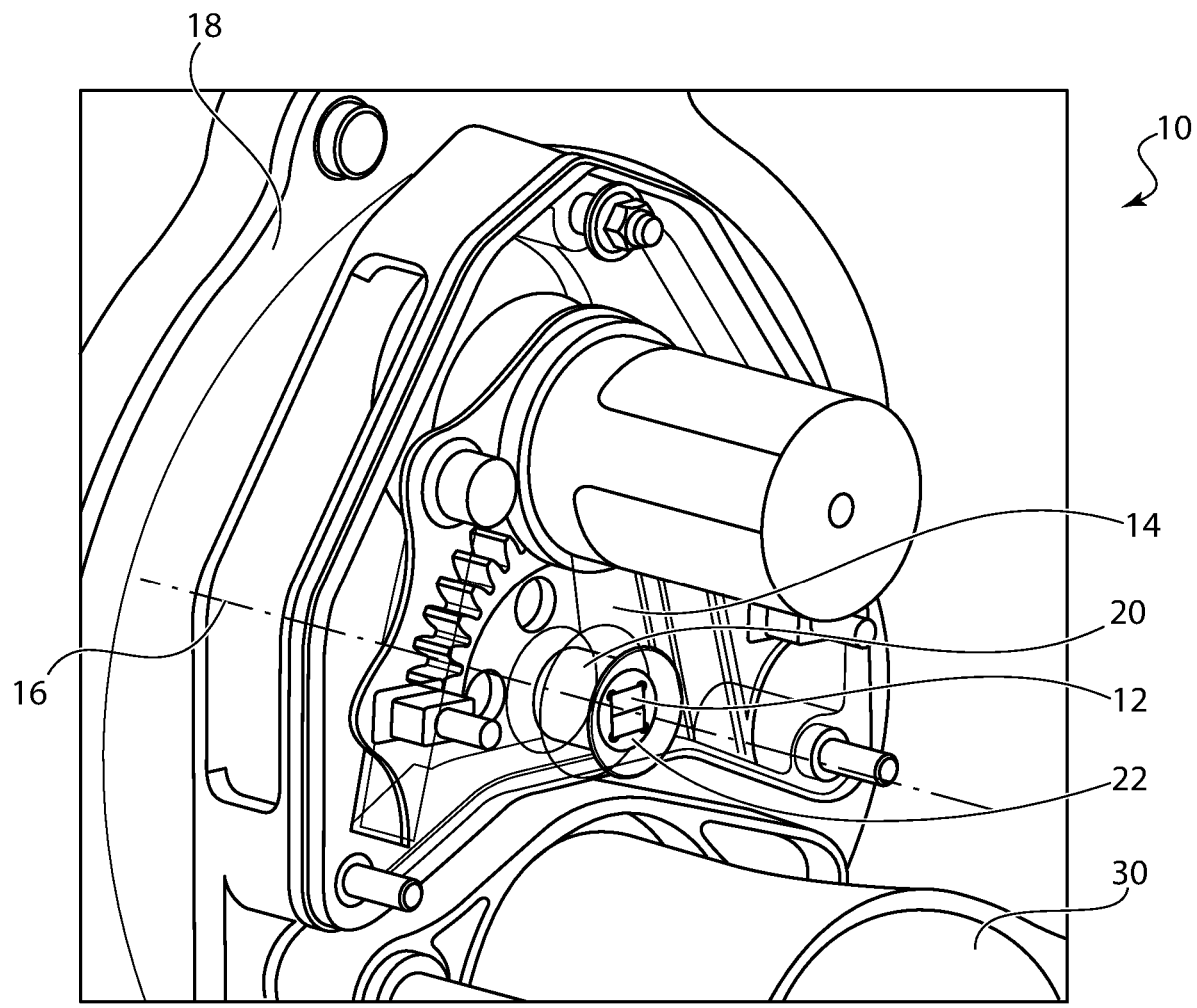
FIG. 1 is a side perspective view of a vacuum toilet flush system.
Figure 2:
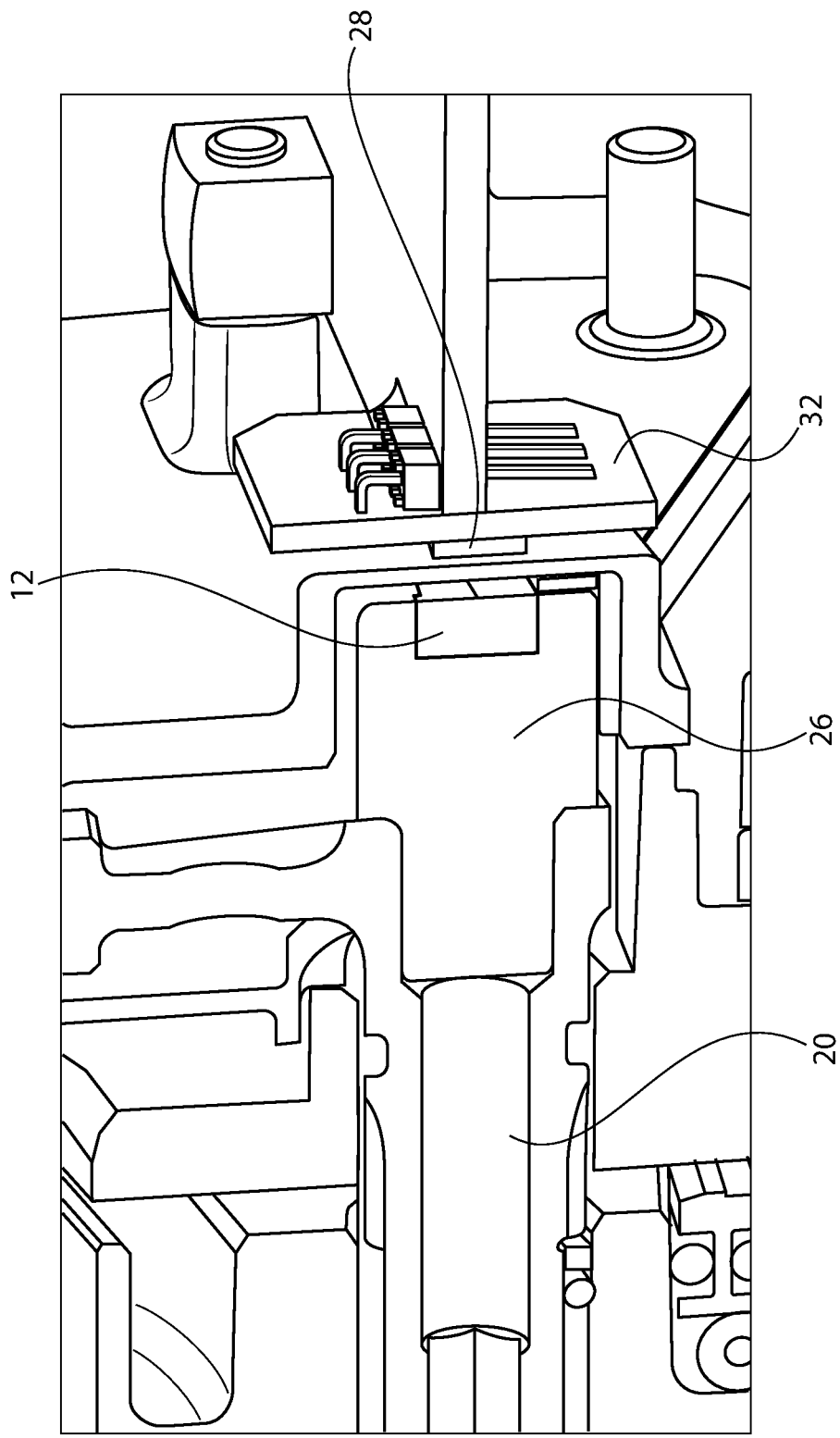
FIG. 2 is a side cross-sectional view of the vacuum toilet flush system of FIG. 1.

The disclosed flush valve system 10 uses a magnet 12 coupled to an orbital flush valve plate 14. Specifically, the magnet 12 may be coupled to the axis of rotation 16 of the flush valve plate 14. Referring to FIG. 1, there is shown a flush valve housing 18 that encloses the flush valve plate 14. The flush valve plate 14 rotates about a shaft 20. In one specific example, a two-pole permanent magnet 12 can be installed coaxially at one end 22 of the shaft 20, and the shaft 20 is directly coupled to the flush valve plate 14. The magnet 12 may be positioned along a centerline or axis of rotation 16 of the shaft 20. (In use, the shaft is driven by a gear, and the gear is attached to a motor. The flush valve plate 14 spins concentrically with the magnet in its position.) The shaft 20 can be machined at one end 22 to accept the magnet 12, which aligns the magnet 12 to a known orientation with respect to the flush valve plate port 24. In other embodiments, the magnet 12 can be positioned on a magnet holder 26 that is secured to the shaft 20, as shown by FIG. 2.

Figure 3:
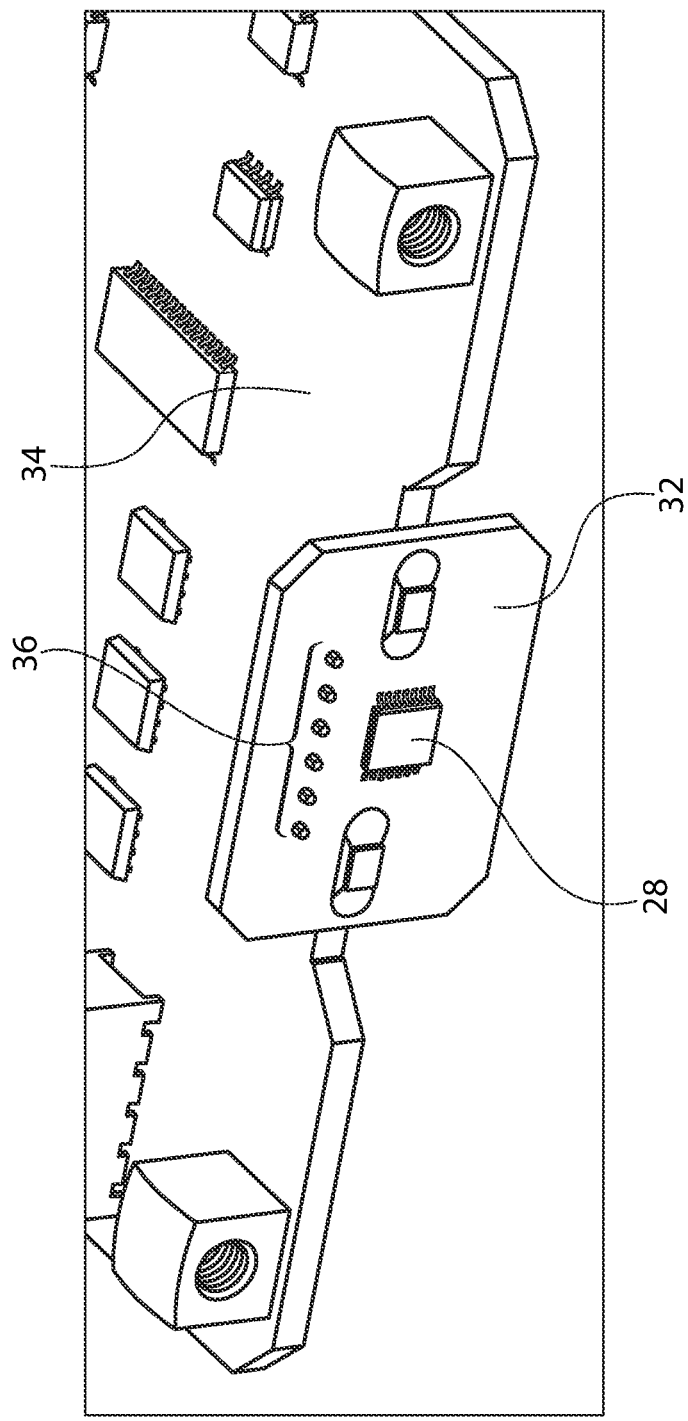
FIG. 3 is a close-up view of a magnetic position sensor on a printed circuit board.

A magnetic position sensor 28 (which may also be referred to as a "magnetic absolute rotary encoder") may be an integrated circuit that is also placed coaxially to the shaft 20 and in close proximity or otherwise adjacent to the magnet 12. The magnetic position sensor 28 may also be associated with a magnetic position sensor printed circuit board (PCB) 32. This is illustrated by FIGS. 2 and 3. As shown by FIG. 3, the PCB 32 may be mounted on a main board 34 and may have a plurality of connections 36.

Figure 4B:
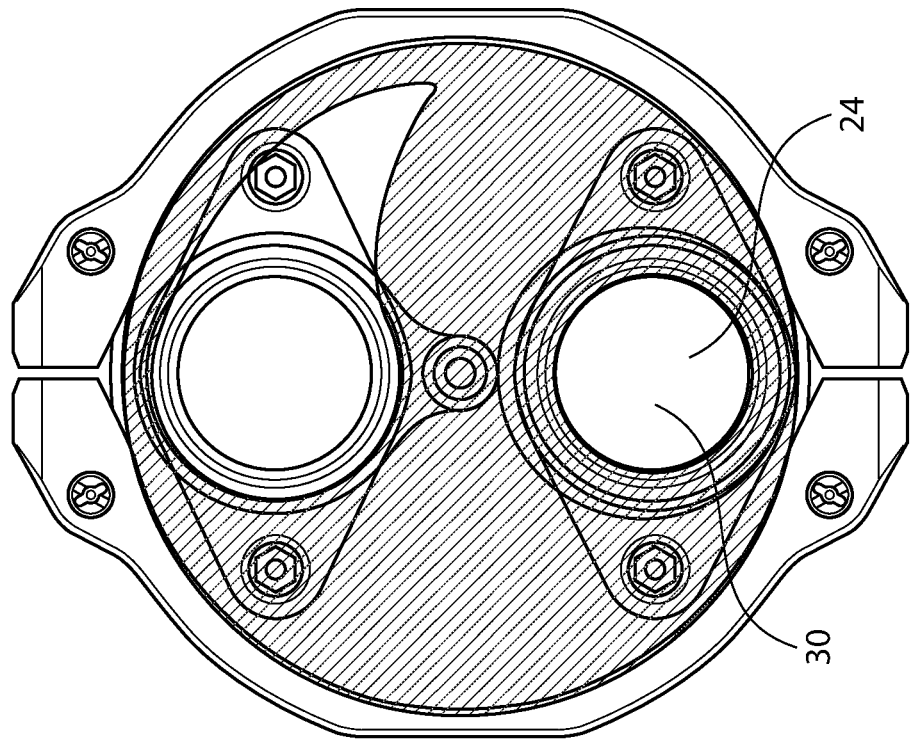
FIG. 4B shows a flush valve plate and an open position, with the port of the flush valve plate aligned with the waste opening.
Figure 4A:
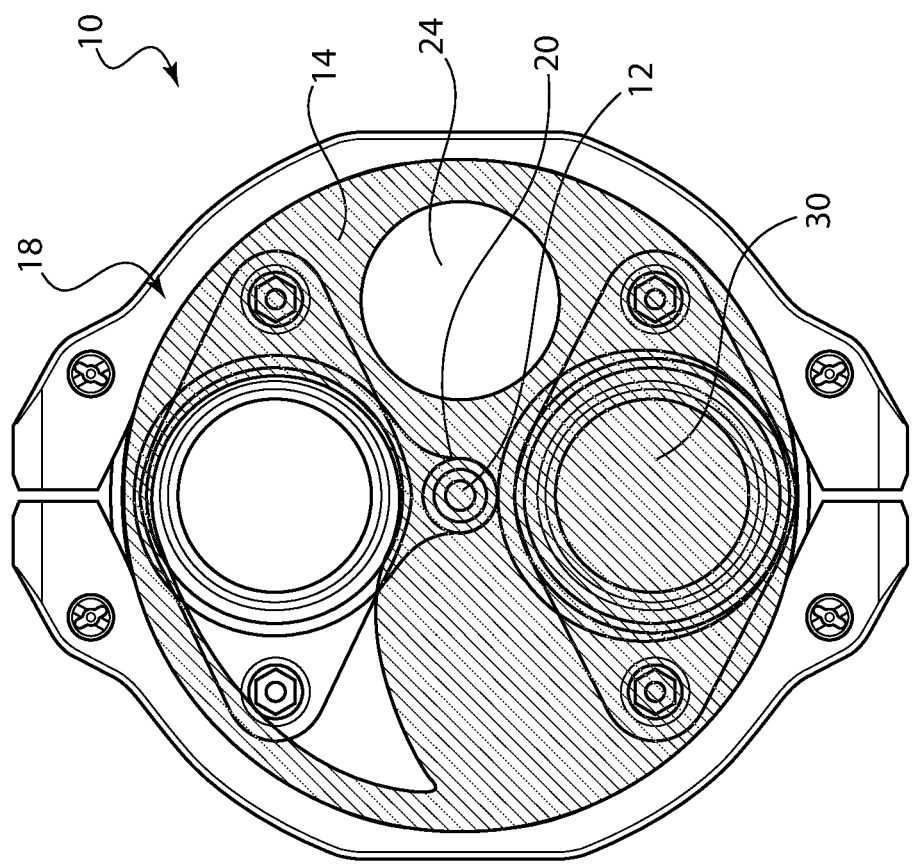
FIG. 4A shows a flush valve plate in a closed position, with the port of the flush valve plate not aligned with the waste opening.

The magnetic position sensor 28 is able to read the position of the magnet 12 and consequently, the orientation of the shaft 20 to which the magnet 12 is attached, and further, the orientation of the flush valve plate port 24. This is shown by FIGS. 4A and 4B. In a specific example, positioning the magnet and the magnetic position sensor 28 this way identifies when the flush valve plate 14 is in an aligned position (e.g., in a position in which the port 24 is perfectly aligned with the waste opening 30 of the housing 18.) It is preferable for the aligned position to be zeroed out, as described in more detail below.

Positioning the magnet 12 and magnetic position sensor 28 as disclosed can help eliminate manufacturing tolerances when the position of the port 28 is to be detected. Specifically, manufacturing tolerances at the center of the flush valve plate, manufacturing variances to the port, and manufacturing variances at the motor/gear/shaft can all be slightly off. During initial assembly (or during repair), the ideal position of the flush valve plate 14 can be manually (electronically) encoded. From then on, the magnetic position sensor 28 can accurately sense the position of the magnet 12, and therefore the ideal port position.

It is also possible for the system to use the information identified in order to calculate velocity and/or acceleration of the flush valve plate. Velocity and acceleration are derived terms calculated by the processor from the degree of position change over time. This data may be used in the motor control algorithm in order to optimize performance and evaluate mechanical condition of the valve over time.

The magnetic position sensor 28 may reside within a protective enclosure with the controller that is environmentally sealed and shielded from electrostatic fields. The magnetic position sensor 28 detects the field produced by the magnet 12 though a non-magnetic wall of the enclosure. Due to the close proximity of the magnet 12 to the sensor 28, normal levels of externally applied magnetic fields will not affect the sensor reading. However, for extraordinarily hostile electromagnetic environments a magnetic shield may be employed to ensure sensor accuracy.

The magnetic position sensor 28 remains stationary with a known orientation with respect to the housing 18. By interpreting the magnetic orientation of the magnet 12 and the angle of the shaft 20, the position of the port 24 can be determined with great precision. The absolute angle of the flush valve plate 14 is presented to the controller for position control and is used to control the acceleration and deceleration of the shaft 20 in order to achieve the intended position as quickly as possible without overshoot using proportional integral derivative (PID) control.

The magnetic position sensor 28 remains accurate and stable during power cycling and does not require periodic procedures to "home" or "zero" in order to maintain accuracy. Since the position information is absolute, the valve may be driven directly to the desired position without delay following a power disruption.

Installing the magnet 12 on a known position of the shaft 20 relative to the flush valve plate 14 allows to system 10 to precisely determine when and how the flush valve plate 14 is aligned. The electromechanical area can be completely sealed from the electronics, increasing reliability and electromagnetic compliance. This system 10 also allows for infinite control over the flush valve plate 14, as opposed to current systems that can only detect open and closed. This configuration gives more accurate and precise information than other solutions attempted to date. For example, some previous solutions were only triggered at the end of rotation (such that they only detected the end of travel) and could only sense whether the port was open or closed, but nothing in between. Some of these earlier solutions have used what is known as "relative" sensing, where the mechanism must be driven to a known position such as a mechanical stop to establish a "zero" or home position from which to count impulses from the magnet sensor positioned on the motor, thereby tracking the present position relative to home. This count is lost (or at least unreliable if stored in a non-volatile memory) since the mechanism may be moving when power is lost or interrupted and inertia continues its movement. These "relative position" systems tracked whether the motor was turning and calculated motor rotations in order to determine a relative position of the motor.

By contrast, the disclosed system, 10 reads the mechanism's "absolute" shaft position directly from the magnet with no requirement for zeroing or calibration during use, even after removal of power. Additionally, there is no requirement for storing the last known position value. The disclosed system 10 can determine the exact location of the flush valve plate port 24, at open or closed, but also at any position in between. This provides detection of the absolute position of flush valve plate 14. Being able to detect the absolute position of the flush valve plate 14 can be beneficial to detect if the flush valve plate 14 is a slowing down, if a clog occurs, or if stoppage or backup occurs. Such detection can also provide information about the valve speed, acceleration, or deceleration thereby optimizing control efficiency and overall performance.

This disclosure is also useful for diagnostic and/or maintenance purposes. The absolute continuous positioning supports optimum motor control and advanced diagnostics and prognostics (early detection and prediction of failures). The magnet 12 is separated environmentally from the magnetic position sensor 28 and control electronics, which improves reliability and electromagnetic compliance. The high-resolution position information combined with advanced diagnostics and recovery algorithms reduces the potential for valve clogging, improving functional reliability thereby improving the customer experience and value.

This is the first time that absolute magnetic position sensor technology has been utilized on an aircraft vacuum waste toilet flush valve to allow a means of determining valve actuation velocity and continuous location of valve flush plate in order to reduce clogging. The system may also be used to control acoustic levels.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sensing system for a vacuum flush waste system, comprising:
   a flush valve plate positioned within a housing, the flush valve plate having a rotational shaft and a port, the housing having a waste opening;
   a magnet positioned on a centerline of an axis of rotation of the rotational shaft; and
   a magnet position sensor positioned coaxially to the axis of rotation of the rotational shaft and adjacent to the magnet and configured to sense the absolute position of the magnet, wherein the sensing system senses an absolute position of the magnet in order to relay information about a location of the port with respect to the waste opening.

2. The system of claim 1, further comprising a printed circuit board onto which the magnet position sensor is mounted.

3. The system of claim 1, wherein the magnet and the magnet position sensor are encased in protective housings.

* * * * *